Aug. 24, 1965  H. C. BECK  3,201,989
DIFFERENTIAL PRESSURE TRANSDUCER
Filed July 27, 1962  3 Sheets-Sheet 1

INVENTOR.
HENRY C. BECK
BY
Philip Schneider
ATTORNEY

Aug. 24, 1965  H. C. BECK  3,201,989
DIFFERENTIAL PRESSURE TRANSDUCER
Filed July 27, 1962  3 Sheets-Sheet 2

INVENTOR.
HENRY C. BECK
BY Philip Schneider
ATTORNEY

INVENTOR.
HENRY C. BECK
BY Philip Schneider
ATTORNEY

United States Patent Office 3,201,989
Patented Aug. 24, 1965

3,201,989
DIFFERENTIAL PRESSURE TRANSDUCER
Henry C. Beck, Ossining, N.Y., assignor to the United States of America as represented by the Secretary of the Navy
Filed July 27, 1962, Ser. No. 213,067
8 Claims. (Cl. 73—300)

This invention relates to differential pressure transducers and especially to a deep-sea, differential pressure transducer which is extremely accurate at high pressures.

In oceanographic work, it is often necessary to measure small changes in depth and/or small changes in depth from a reference depth. A conventional method employed for this purpose is to measure hydrostatic pressures at different depths and to convert these measurements mathematically into corresponding depths. The ocean, of course, can be described as a "pressure-permeated medium," which term merely means that pressure exists and can be measured at every point within the medium although the measured pressure may be different at different locations. The earth's atmosphere constitutes another example of this type of medium.

The accuracy of most commercially available pressure transducers is expressed as a percentage of the range of the instrument. Thus, the accuracy of high-pressure transducers for small changes in pressure is poor. The present invention permits the use of a limited-range differential pressure transducer to measure small pressure differences in a high-pressure environment thereby taking advantage of the high accuracy inherent in a low-range instrument.

A typical embodiment of the present invention utilizes a differential piston opposed by a spring to drive an adjustable valve which closes one port of a low-range differential pressure transducer at a pre-determined point of high pressure. A second port of the differential pressure transducer is always exposed to the ambient environment (sea water) so that differences between the ambient pressure and the pre-determined pressure are measured.

An object of this invention is to accurately measure small differences in pressure at high average pressure levels.

Another object is to accurately measure small differences in pressure at great depths in an oceanic environment.

Other objects and many of the attendant advantages of this invention will be readily appreciated as the same becomes better understood by reference to the following detailed description when considered in connection with the accompanying drawings wherein.

Figure 1:
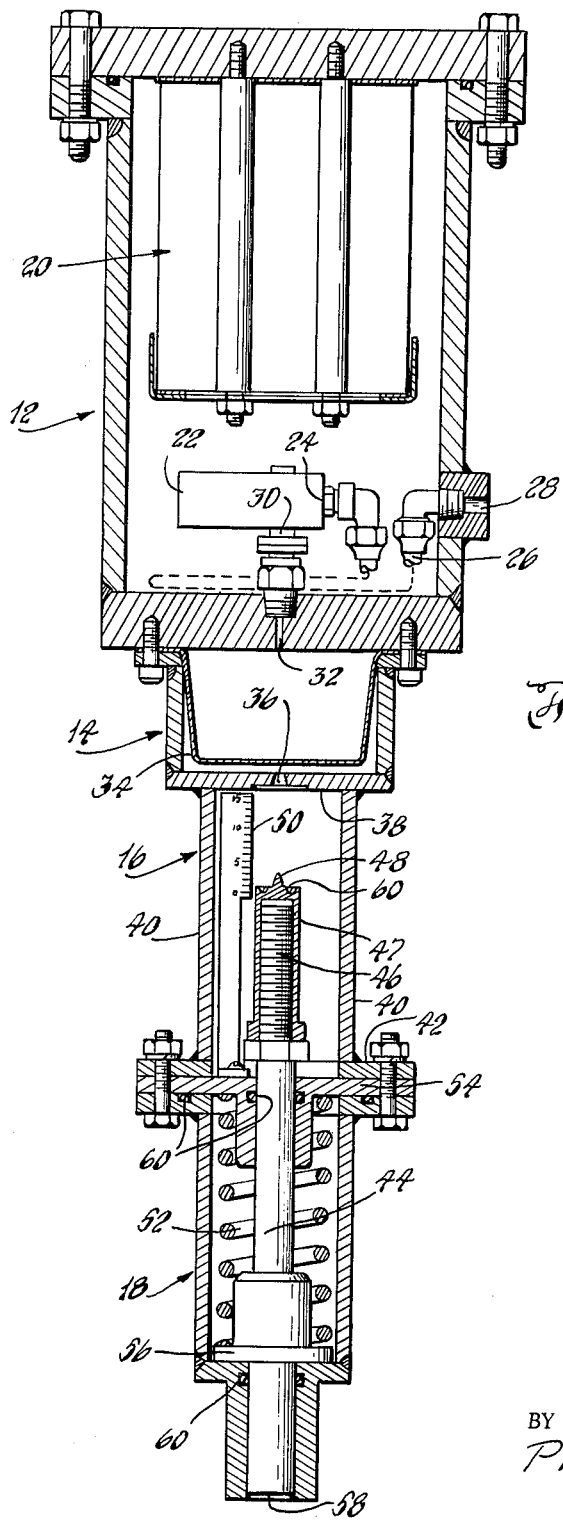
FIG. 1 is a cross-sectional view of an embodiment of the invention taken along the line 1—1 in FIG. 2.

FIG. 1 illustrates an embodiment of the invention which is divided into two basic parts consisting of pressure transducer means which is responsive to differential pressure and piston means for providing a reference pressure for the pressure transducer means. The pressure transducer means comprises a low-range (0–100 p.s.i.) differential pressure gauge 22, a power source such as a battery, the electronic equipment required for the propagation of the electrical signal output of the pressure gauge through cables to another location and collapsible diaphragm means 34 in a diaphragm chamber. The power and electronic equipment are not shown but are indicated generally by the numeral 20, and this equipment and the pressure gauge are enclosed in a fluid-tight gauge chamber 12.

The gauge 22 has one opening (the ambient inlet) 24 which is coupled through tubing 26 (shown partially broken away and dotted) to a port (the ambient port) 28 in the casing of the gauge chamber 12 and another opening (the reference inlet) 30 which is coupled to an opening (the reference port) 32 in the second chamber (the diaphragm chamber) 14.

The casing of the diaphragm chamber 14 encloses a molded diaphragm 34, the space between the molded diaphragm 34 and the gauge chamber 12 being fluidtight. This diaphragm 34 is made of synthetic rubber and is collapsible. A valve port 36 provides a passageway through the partition 38 which separates the diaphragm chamber 14 from the open piston chamber 16.

The piston means comprises an open piston chamber 16, a closed piston chamber 18, a piston rod 44, a piston spring 52 and a ruler 50. The open piston chamber 16 is open to the influx of the surrounding environment. Its "casing" consists of four rod-like members 40 (two being shown in FIG. 1) which are welded or otherwise bonded at one end to the partition 38 and at the other end to a flange 42. The purpose of the rod-like members 40 is to support the closed piston chamber 18 and the piston members; fewer members 40 can be employed if they furnish sufficient support.

The piston rod 44 extends through the open 16 and the closed 18 piston chambers and has an exteriorly threaded end 46 in the open chamber 18. An interiorly threaded valve cylinder 47 is screwed on the threaded end 46 of the piston rod 44. The valve cylinder 47 bears a valve plug 48 at the end of the cylinder 47 closest to the valve port 36. A cylindrical piston spring 52 extends between a flange 56 on the piston rod 44 and the opposite transverse wall 54 of the closed piston chamber 18. A ruler 50 which extends along the direction of the piston-rod axis is located within the open piston chamber 16.

The operation of the device is as follows:

The pressure transducer, or gauge, 22 has as its active element a diaphragm which, when deflected, moves a coil which varies the reluctance of an electrical circuit which, in turn, varies the frequency of an electrical signal. There is an air chamber on one side of the diaphragm, the reference opening 30 being coupled therewith. The other side of the diaphragm is exposed to the ambient environment (sea water) through the ambient opening 24, connecting tubing and the ambient port 28.

As the device is lowered into the sea, the water exerts increasing pressure upon the ambient side of the diaphragm and equal pressure upon the collapsible diaphragm 34, since the water has access to the latter through the open piston chamber 16 and the valve port 36. The collapsible diaphragm 34 shrinks in size, thereby correspondingly increasing the air pressure in the air-chamber side of the gauge diaphragm.

This pressure increases until the valve plug 48, which has been moving towards the valve, or reference, port 36, as the piston is forced inward by pressure of the sea water against its end face 58, is fully seated in the valve port 36. The seating of the valve plug 48 traps the water which is within the diaphragm chamber and prevents any further influx of water, thereby preventing any further increase of pressure against the collapsible diaphragm 34 and hence against the air-chamber side of the transducer diaphragm.

This reference pressure (the pressure existing when the valve port 36 is closed) is determined by the distance between the valve port 36 and the valve plug 48 and is preset by screw adjustment between the valve-plug cylinder and the threaded end of the piston. After the valve port 36 is closed, lowering of the device still increases the pressure against the ambient side of the transducer diaphragm. The difference between this pressure and the preset reference pressure affects the electrical signal by moving the transducer diaphragm, the frequency of the signal indicating the difference in depth between the reference depth and the depth of the device.

The pressure transducer may, for example, be an Ultradyne model S–90–TA–100 which is able to measure differential pressures up to 100 p.s.i.

The device is made fluidtight at the necessary points by means of rubber "O-rings" 60. The metal employed is stainless steel, a metal which has strength and anti-corrosion properties.

Figure 2:
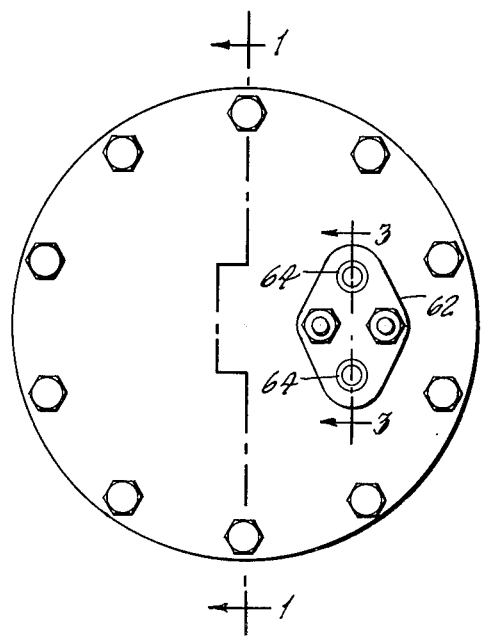
FIG. 2 is an end view of the embodiment shown in cross-section in FIG. 1.
Figure 3:
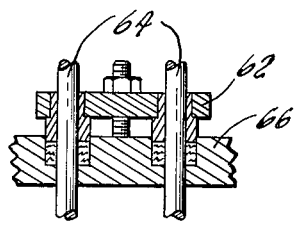
FIG. 3 is a fragmentary cross section taken along the line 3—3 in FIG. 2 and shows details of the seal through which leads are brought out of the device.

An end view of the device is shown in FIG. 2. The device has an end seal 62 through which two electrical cables 64 are brought in. A fragmented cross-section of the end seal 62 and end plate 66 of the gauge chamber 12 is shown in FIG. 3.

Figure 4:
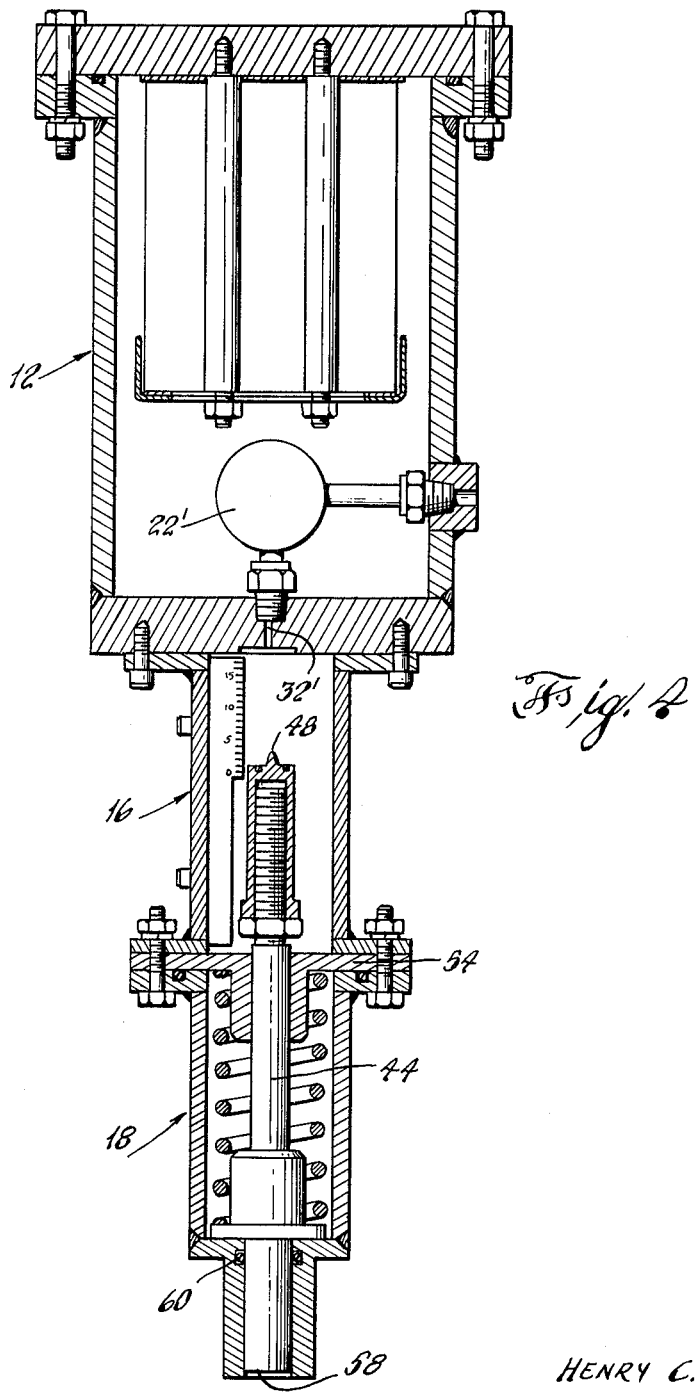
FIG. 4 is a cross-sectional view of another embodiment of the invention.

FIG. 4 illustrates an embodiment which employs a pressure gauge 22' in which both sides of the gauge diaphragm can be exposed to sea water. In this case, the collapsible diaphragm 34 and the diaphragm chamber 14 of FIG. 1 are unnecessary and the reference port also functions as the valve port. The combined reference and valve port is denoted by numeral 32'. The unit is otherwise similar to that in FIG. 1.

Obviously many modifications and variations of the present invention are possible in the light of the above teachings. It is therefore to be understood that within the scope of the appended claims the invention may be practiced otherwise than as specifically described.

I claim:

1. A depth-measuring device comprising, in combination:

transducer means including a casing formed with an ambient port and a reference port both coupled with the ambient environment and pressure-gauge means having two openings and being responsive to the difference in pressure at said two openings, one said opening being coupled pressurewise with said ambient port and the other said opening being coupled pressurewise with said reference port; and piston means including a piston rod, means movable along one end of said piston rod and a valve plug affixed to one end of said movable means, said piston rod moving a distance corresponding to the ambient pressure and acting to seat said valve plug in said reference port at a predetermined ambient pressure when said piston rod has moved a predetermined distance, thereby closing off said reference port and fixing a reference pressure level at the reference opening of said pressure-gauge means.

2. A device as set forth in claim 1, further including a ruler arranged parallel to said piston rod whereby the distance of said valve plug from said reference port can be set accurately.

3. A depth-measuring device comprising, in combination:

transducer means comprising a fluidtight gauge chamber formed with an ambient port and a reference port, a differential pressure gauge having two openings for the application of pressure thereto, the difference of said pressures being measured by said gauge, a diaphragm chamber affixed to the reference port end of said gauge chamber, said diaphragm chamber being formed with a valve port therein, and a collapsible fluidtight diaphragm within said diaphragm chamber, said diaphragm being situated between said reference port and said valve port so that the reference port side of the diaphragm chamber is made fluidtight, one said pressure-gauge opening being exposed to the ambient pressure by being coupled with said ambient port and the other said pressure-gauge opening being exposed to the pressure in said diaphragm chamber by being coupled with said reference port; and piston means comprising a piston chamber affixed to said diaphragm chamber, one section of said piston chamber being fluidtight and the other section being open to the ambient medium, said other section being located adjacent to said valve port, a piston rod having a threaded end, said piston rod being located in the open section of the piston chamber, a valve member having an internally threaded cylindrical body and a valve plug affixed at one end thereof, said body being screwable upon the threaded end of said piston rod, and said plug being shaped to close off said valve port when seated therein by axial movement of said piston rod, a spring located within the closed section of said piston chamber and acting upon said piston rod to oppose the ambient pressure which forces said piston rod in such a direction as to seat said valve plug in said valve port, thereby establishing a reference pressure within said diaphragm chamber at the pressure at which said seating occurs.

4. A device as set forth in claim 3, further including a ruler located within said open section of said piston chamber and arranged parallel to said piston rod whereby the original distance of said valve plug from said valve port can be set accurately.

5. A device as set forth in claim 3, further including electronic means located within said gauge for producing an electrical signal having a frequency which is proportional to the difference in pressure is measured by said differential pressure gauge.

6. A depth-measuring device comprising, in combination:

transducer means comprising a fluidtight gauge chamber formed with an ambient port and a valve port, a differential pressure gauge having two openings for the application of pressure thereto, the difference of said pressures being measured by said gauge, one said pressure-gauge opening being exposed to the ambient pressure by being coupled with said ambient port and the other said pressure-gauge opening being exposed to the ambient pressure by being coupled with said valve port; and piston means comprising a piston chamber affixed to said gauge chamber, one section of said piston chamber being fluidtight and the other section being open to the ambient medium, said other section being located adjacent to said valve port, a piston rod having a threaded end, said piston rod being located in the open section of the piston chamber, a valve member having an internally threaded cylindrical body and a valve plug affixed at one end thereof, said body being screwable upon the threaded end of said piston rod, and said plug being shaped to close off said valve port when seated therein by axial movement of said piston rod, and a spring located within the closed section of said piston chamber and acting upon said rod to oppose the ambient pressure which forces said piston rod in such a direction as to seat said valve plug in said valve port, thereby establishing a reference pressure at the pressure-gauge opening which is coupled with said valve port, said reference being the ambient pressure at which said seating occurs.

7. A device as set forth in claim 6, further including a ruler located within said open section of said piston chamber and arranged parallel to said piston rod whereby the original distance of said valve plug from said valve port can be set accurately.

8. A device as set forth in claim 6, further including electronic means located within said gauge chamber for producing an electrical signal having a frequency which is proportional to the difference in pressure which is measured by said differential pressure gauge.

References Cited by the Examiner

UNITED STATES PATENTS

| 1,420,628 | 6/22 | Fox | 73—302 |
| 2,700,306 | 1/55 | Johnson | 73—407 X |

FOREIGN PATENTS 1,084,711  7/54  France.

ISAAC LISANN, *Primary Examiner*.